United States Patent
Nakamura et al.

(10) Patent No.: US 6,824,588 B2
(45) Date of Patent: Nov. 30, 2004

(54) APPARATUS AND METHOD FOR PURIFYING AIR USED IN CRYOGENIC AIR SEPARATION

(75) Inventors: Morimitsu Nakamura, Tokyo (JP); Kazuhiko Fujie, Tokyo (JP); Yasuo Tatsumi, Tokyo (JP); Masato Kawai, Tokyo (JP)

(73) Assignee: Nippon Sanso Corporation, Tokyo (JP)

(*) Notice: Subject to any disclaimer, the term of this patent is extended or adjusted under 35 U.S.C. 154(b) by 0 days.

(21) Appl. No.: 10/064,503

(22) Filed: Jul. 23, 2002

(65) Prior Publication Data

US 2003/0029314 A1 Feb. 13, 2003

(30) Foreign Application Priority Data

Aug. 7, 2001 (JP) .................................... 2001-239159
Oct. 25, 2001 (JP) .................................... 2001-328366

(51) Int. Cl.[7] .......................... F25J 31/04; F25J 31/08; B01D 53/04
(52) U.S. Cl. .................. 95/117; 95/129; 95/139; 95/143; 95/132
(58) Field of Search .................. 95/90, 117, 129, 95/139, 143, 902; 96/108, 121, 130–133; 502/79

(56) References Cited

U.S. PATENT DOCUMENTS

| | | | |
|---|---|---|---|
| 5,779,767 A | 7/1998 | Golden et al. | 95/96 |
| 5,919,286 A | 7/1999 | Golden et al. | 95/98 |
| 6,106,593 A * | 8/2000 | Golden et al. | 95/120 |
| 6,143,057 A | 11/2000 | Bulow et al. | 95/96 |
| 6,244,071 B1 | 6/2001 | Gary et al. | 62/642 |
| 6,273,939 B1 | 8/2001 | Millet et al. | 95/106 |
| 6,350,298 B1 | 2/2002 | Su et al. | 95/96 |
| 6,391,092 B1 | 5/2002 | Shen et al. | 95/120 |
| 6,409,800 B1 * | 6/2002 | Ojo et al. | 95/96 |
| 6,432,171 B1 * | 8/2002 | Kumar et al. | 95/120 |
| 2002/0014159 A1 * | 2/2002 | Tatsumi et al. | 96/130 |

FOREIGN PATENT DOCUMENTS

| | | |
|---|---|---|
| EP | 0 992 274 A1 | 4/2000 |
| EP | 1092465 A2 * | 4/2001 |
| JP | 03-153820 | 7/1991 |
| JP | 03-153821 | 7/1991 |
| JP | 2000140550 A * | 5/2000 |
| JP | 2000-279752 | 10/2000 |
| JP | 2001-062238 | 3/2001 |

* cited by examiner

Primary Examiner—Frank M. Lawrence
(74) Attorney, Agent, or Firm—Jiang Chyun IP Office (57) ABSTRACT

An apparatus and a method for purifying the air used in cryogenic air separation are described, which are capable of effectively removing nitrogen oxides and/or hydrocarbons. The apparatus comprises an adsorber comprising an adsorption cylinder that has a first adsorbing layer and a second adsorbing layer therein. The first adsorbing layer is composed of a first adsorbent capable of selectively adsorbing water in the air. The second adsorbing layer is composed of a second adsorbent capable of selectively adsorbing nitrogen oxide and/or hydrocarbon in the air passing the first adsorbing layer, wherein the second adsorbent comprises an X zeolite containing magnesium ion as an ion-exchangeable cation.

7 Claims, 11 Drawing Sheets

APPARATUS AND METHOD FOR PURIFYING AIR USED IN CRYOGENIC AIR SEPARATION

CROSS REFERENCE TO RELATED APPLICATIONS

This application claims the priority benefit of Japanese application serial no. 2001-239159 filed on Aug. 7, 2001, 2001-328366 filed on Oct. 25, 2001.

BACKGROUND OF INVENTION

1. Field of Invention

The present invention relates to an apparatus and a method for purifying the air used as a raw material in cryogenic air separation that separates nitrogen and oxygen mainly by distilling the air at low temperatures. More particularly, the present invention relates to an apparatus and a method for purifying the raw air capable of effectively removing nitrogen oxides and/or hydrocarbons from the raw air.

2. Description of Related Art

To produce nitrogen, oxygen and argon, the cryogenic air separation that separates the air by using low temperature distillation is performed. When the raw air is to be supplied for cryogenic air separation, the purification of the raw air is performed in order to remove trace impurities from the raw air. In the purification of the raw air, mainly water ($H_2O$) and carbon dioxide ($CO_2$) are removed. In the cryogenic air separation, nitrogen oxides (e.g., dinitrogen oxide ($N_2O$)) and hydrocarbons having boiling points higher than that of the oxygen are condensed in the liquid oxygen. The nitrogen oxides and the hydrocarbons solidify and deposit in the heat exchanger and the distilling tower at low temperatures, so the heat exchanger and the distilling tower may be jammed. Moreover, these are the causes of possible explosions in oxygen atmosphere and must be prevented in advance.

Therefore, in view of safety, it is highly required to remove nitrogen oxides and hydrocarbons in the purification of the raw air to prevent them from being condensed in liquid oxygen. As a technique for removing nitrogen oxides and hydrocarbons, a method is provided using the adsorbents composed of zeolites to adsorb and remove them.

Japanese Patent Application Laid Open No. 2000-107546 discloses an apparatus that uses an adsorption cylinder to remove $H_2O$, $CO_2$ and $N_2O$. The adsorption cylinder has a laminated structure of a first, a second and a third adsorbing layers that comprise 3 adsorbents corresponding to $H_2O$, $CO_2$ and $N_2O$, respectively. The adsorbent for removing $N_2O$ includes, for example, calcium-exchanged X zeolites, sodium mordenite, barium-exchanged zeolites and binderless calcium-exchanged zeolites. Moreover, Japanese Patent Application Laid Open No. 2000-140550 discloses an apparatus that uses adsorbents comprising faujasite zeolites to remove at least a portion of $N_2O$ gas from the air. Furthermore, Japanese Patent Application Laid Open No. 2001-129342 discloses an apparatus that uses an adsorbent to remove the nitrogen oxides and the hydrocarbons from the air after the removal of $H_2O$ and $CO_2$. The adsorbent is, for example, an X zeolite that has a Si/Al ratio within a range of 0.9~1.3 and contains calcium and other ions.

However, by using the conventional techniques mentioned above, nitrogen oxides and hydrocarbons, particularly those excluding unsaturated hydrocarbons, are difficult to remove effectively. Therefore, a new technique capable of effectively removing hydrocarbons and nitrogen oxides is desired. Particularly, in view of safety, the development of the method for removing $N_2O$ is highly required.

SUMMARY OF INVENTION

In view of the aforementioned problems, this invention provides an apparatus and a method for purifying the raw air that can effectively remove nitrogen oxides and/or hydrocarbons as used to purify the air used in cryogenic air separation.

The apparatus for purifying the air used in cryogenic air separation comprises an adsorber comprising an adsorption cylinder that has a first adsorbing layer and a second adsorbing layer therein. The first adsorbing layer is composed of a first adsorbent capable of selectively adsorbing $H_2O$ in the air. The second adsorbing layer is composed of a second adsorbent capable of selectively adsorbing nitrogen oxides and/or hydrocarbons in the air flowing through the first adsorbing layer, wherein the second adsorbent comprises an X zeolite containing magnesium ion as an ion-exchangeable cation. The second adsorbent containing magnesium is preferably fabricated by exchanging a portion or all of the sodium ions in a sodium X zeolite with magnesium, wherein the magnesium-exchange ratio in total cations is preferably higher than 40%. Moreover, the second adsorbent may comprises an X zeolite contains magnesium and calcium ions as ion-exchangeable cations, wherein the magnesium-exchange ratio in total cations is preferably higher than 5%. Furthermore, an A zeolite containing calcium and magnesium ions as ion-exchangeable cations can be used to replace the X zeolite containing magnesium as the second adsorbent that constitutes the second adsorbing layer, wherein the magnesium-exchange ratio in the total cations of the A zeolite is preferably higher than 5%. In addition, the adsorption cylinder can comprise a third adsorbing layer composed of an adsorbent capable of selectively adsorbing $CO_2$ in the air between the first adsorbing layer and the second adsorbing layer.

The method for purifying the raw air used in cryogenic air separation comprises the following steps. A purifying apparatus is provided comprising an adsorber, which comprises an adsorption cylinder that has a first adsorbing layer and a second adsorbing layer therein. The first adsorbing layer is composed of a first adsorbent capable of selectively adsorbing $H_2O$ in the raw air. The second adsorbing layer is composed of a second adsorbent capable of selectively adsorbing nitrogen oxides and/or hydrocarbons in the air flowing through the first adsorbing layer, wherein the second adsorbent comprises an X zeolite containing magnesium ion as an in-exchangeable cation. After the water in the raw air is adsorbed and removed by the first adsorbing layer, the nitrogen oxides and/or the hydrocarbons in the raw air are adsorbed and removed by the second adsorbing layer. The second adsorbing layer may also adsorb and remove $CO_2$. Alternatively, the method can use a purifying apparatus with a third adsorbing layer that is disposed between the first and the second adsorbing layers and is composed of an adsorbent capable of selectively adsorbing $CO_2$ in the air. Thus the method can adsorb and remove $CO_2$ from the air passing the first adsorbing layer by using the third adsorbing layer.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 schematically illustrates an apparatus for purifying the raw air used in cryogenic air separation according to a first embodiment of this invention.

DETAILED DESCRIPTION

Figure 1:
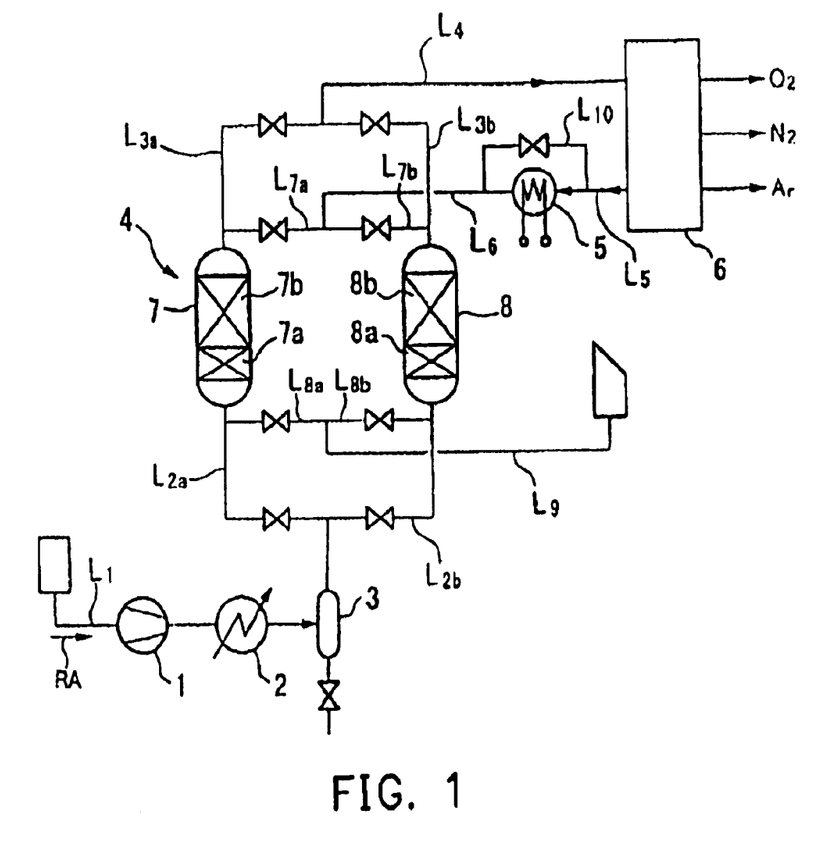

FIG. 1 schematically illustrates an apparatus for purifying the raw air used in cryogenic air separation according to the first embodiment of this invention. The purifying apparatus is mainly constituted by an air compressor 1 for compressing the raw air RA, a cooler 2 for cooling the compressed raw air, a water separator 3 for separating drain water from the raw air, an adsorber 4 for removing impurities from the air flowing through the water separator 3, and a heater 5. The numeral "6" indicates a cryogenic air separation device.

The water separator 3 can condense the saturated water vapor in the compressed raw air with pressurization and separate the condensed water. The adsorber 4 comprises a first adsorption cylinder 7 and a second adsorption cylinder 8, and the raw air can be conducted into one of the two adsorption cylinders 7 and 8. The adsorber 4 is constituted so that when an adsorbing process is performed in one adsorption cylinder, a regenerating can be performed in the other one. Thus, by alternatively using the two adsorption cylinders 7 and 8, the purification of the raw air can be conducted continuously.

The adsorption cylinder 7/8 includes a first adsorbing layer 7a/8a consisting of a first adsorbent capable of selectively adsorbing $H_2O$, and a second adsorbing layer 7b/8b consisting of a second adsorbent capable of selectively adsorbing nitrogen oxides and/or hydrocarbons. The second adsorbing layer 7b/8b is disposed at the downstream side of the airflow direction with respect to the first adsorbing layer 7a/8a.

The adsorbent constituting the first adsorbing layer 7a/8a can be, for example, alumina gel or silica gel. The adsorbent constituting the second adsorbing layer 7b/8b is preferably an X zeolite containing magnesium ion as an ion-exchangeable cation.

The X zeolite containing magnesium is preferably a magnesium X zeolite or a sodium magnesium X zeolite that is fabricated by exchanging all or a portion of the sodium ions in a sodium X zeolite with magnesium. The exchange ratio of magnesium in total cations (the percentage of magnesium ion in ion-exchangeable cations) is preferably higher than 40%. The ion-exchange ratio represents the weight percentage (wt %) here.

Moreover, the second adsorbent may use an X zeolite containing magnesium and calcium ions as ion-exchangeable cations (magnesium calcium X zeolite), wherein the magnesium-exchange ratio in total cations is preferably higher than 5%.

It is known that X zeolites have ratios of silica to alumina (Si/Al ratios) of 1.0~1.5 for the silica and the alumina constituting the framework, wherein those having Si/Al ratios lower than 1.15 are particularly called low-silica X zeolites (LSX). The framework Si/Al ratios of the X zeolites of this invention are not particularly restricted and can be any values between 1.0 and 1.5.

Furthermore, the second adsorbent constituting the second adsorbing layers 7b and 8b may use an A zeolite containing magnesium and calcium ions as ion-exchangeable cations (magnesium calcium A zeolite), wherein the magnesium-exchange ratio in total cations is preferably higher than 5%.

The second adsorbent constituting the second adsorbing layer 7b and 8b can use one of the magnesium X zeolite, the sodium magnesium X zeolite, the magnesium calcium X zeolite and the magnesium calcium A zeolite mentioned above, or a combination of two or more zeolites among them.

The purifying method according to the first embodiment of this invention, which uses the purifying apparatus illustrated in FIG. 1, is described below. The raw air RA is compressed by the compressor 1 passing the pipe L1, and cooled to a predetermined temperature by the cooler 2. After the drain water is removed by the water separator 3, the raw air is conducted into the adsorber 4. In the adsorber 4, the raw air is conducted into one of the first and the second adsorption cylinders 7 and 8. The followings describe an example where the raw air is conducted into the adsorption cylinders 7.

The air, which is conducted into the adsorption cylinder 7 through the pipe L2a, is firstly conducted to the first adsorbing layer 7a at the upstream side, where $H_2O$ in the raw air is adsorbed and removed. The air passing the first adsorbing layer 7a is then conducted to the second adsorbing layer 7b at the downstream side, where the nitrogen oxides and/or the hydrocarbons in the air are adsorbed and removed. In addition, $CO_2$ is also removed by the second adsorbing layer 7b. The air passing the second adsorbing layer 7b as a purified air is conducted into the cryogenic air separation device 6 through the pipes L3a and L4 and then separated into $N_2$, $O_2$ and Ar, etc., with low-temperature distillation.

The operation of the adsorber 4 is described below in detail. When an adsorbing process mentioned above is performed in the first adsorption cylinder 7, a regenerating treatment is performed to the adsorbent in the second adsorption cylinder 8 without the raw air introduced. The regenerating treatment for the second adsorption cylinder 8 utilizes the exhaust gas from the cryogenic air separation device 6 as a regenerating gas. In detail, the exhaust gas is conducted into the adsorption cylinder 8 through the pipes L6 and L7b to heat the adsorbent after being heated to 100~250° C. by the heater 5 through the pipe L5. Thereby, $H_2O$, $CO_2$, the nitrogen oxides and the hydrocarbons that are adsorbed in the adsorbent are desorbed, and the adsorbent is regenerated. The exhaust gas passing the second adsorption cylinder 8 is then emitted through the pipes L8b and L9.

After the regenerating treatment of the adsorbent in the second adsorption cylinder 8 is finished, the exhaust gas from the cryogenic air separation device 6 is conducted through the pipe L10 bypassing the heater 5, and is then conducted into the second adsorption cylinder 8 through the pipes L6 and L7b. Since the exhaust gas does not pass the heater 5, it has a low temperature and can cool the adsorbent that is previously heated in the regenerating treatment.

When the adsorbent in the first adsorption cylinder 7 approaches adsorption saturation, the supply of the raw air to the first adsorption cylinder 7 is stopped and the raw air is supplied into the second adsorption cylinder 8 through the pipe L2b. After the water in the raw air is removed by the first adsorbing layer 8a and the nitrogen oxides and/or the hydrocarbons are removed by the second adsorbing layer 8b, the purified air is then conducted into the cryogenic air separation device 6 through the pipes L3b and L4.

When an adsorbing process is performed in the second adsorption cylinder 8, the exhaust gas from the cryogenic air separation device 6 is heated by the heater 5 and then conducted into the first adsorption cylinder 7 through the pipes L6 and L7a to regenerate the adsorbent. The exhaust gas passing the first adsorption cylinder 7 is then emitted through the pipes L8a and L9. After the regenerating treatment of the adsorbent in the first adsorption cylinder 7 is finished, the exhaust gas from the cryogenic air separation device 6 is conducted into the first adsorption cylinder 7 through the pipes L10, L6 and L7a to cool the adsorbent. As described above, in this purifying method, when an adsorbing process is performed in one adsorption cylinder, a regenerating treatment is performed in the other one. Thus, the purification of the raw air can be conducted continuously by alternatively using the adsorption cylinders 7 and 8.

The purifying apparatus of this embodiment comprises an adsorber 4, which comprises adsorption cylinders 7 and 8 each comprising a first adsorbing layer (7a/8a) and a second adsorbing layer (7b/8b). The first adsorbing layer 7a/8a is composed of a first adsorbent capable of selectively adsorbing $H_2O$. The second adsorbing layer 7b/8b is composed of a second adsorbent capable of selectively adsorbing nitrogen oxides and/or hydrocarbons. The second adsorbent constituting the second adsorbing layer 7b/8b can be one of the magnesium X zeolite, the sodium magnesium X zeolite, the magnesium calcium X zeolite and the magnesium calcium A zeolite, or a combination of two or more zeolites among them to effectively remove the nitrogen oxides and/or the hydrocarbons. Consequently, nitrogen oxides and hydrocarbons can be preventing from being condensed in the distillate in advance, and the safety for operating the cryogenic air separation device 6 can be improved.

Figure 2:
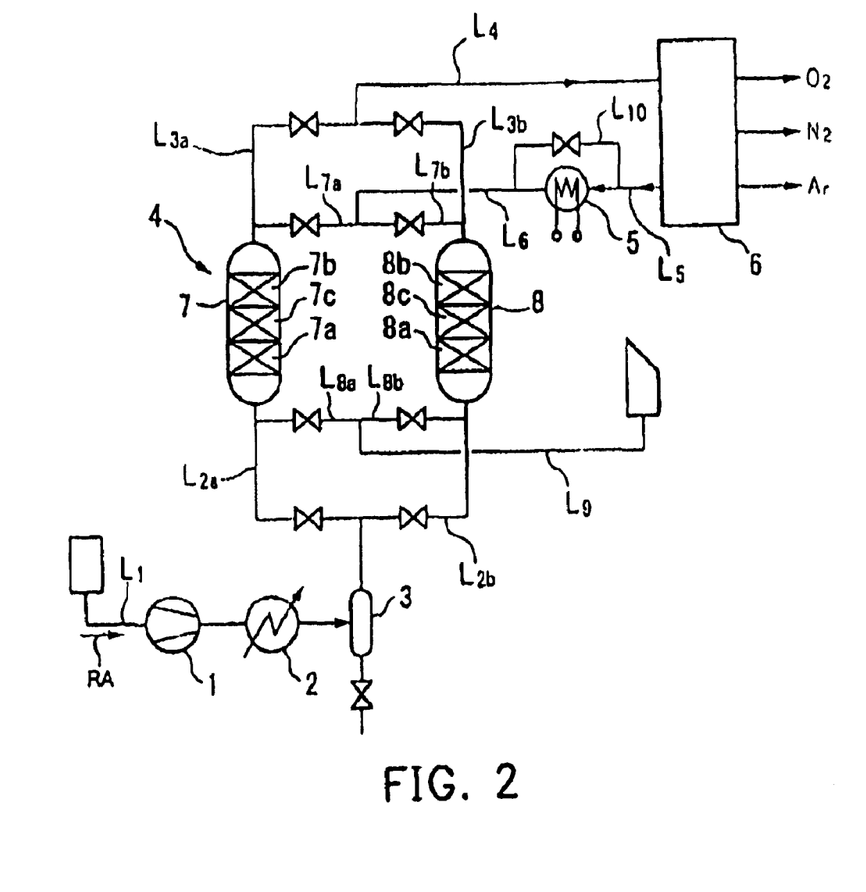
FIG. 2 schematically illustrates an apparatus for purifying the raw air used in cryogenic air separation according to a second embodiment of this invention.

FIG. 2 schematically illustrates a purifying apparatus according to the second embodiment of this invention. The purifying apparatus in FIG. 2 differs from that in FIG. 1 in that a third adsorbing layer 7c/8c composed of an adsorbent capable of selectively adsorbing $CO_2$ is disposed between the first adsorbing layer 7a/8a and the second adsorbing layer 7b/8b in the adsorption cylinder 7/8. As in the apparatus of the first embodiment, the adsorbent constituting the second adsorbing layers 7b and 8b in the present purifying apparatus can be one of the magnesium X zeolite, the sodium magnesium X zeolite, the magnesium calcium X zeolite and the magnesium calcium A zeolite, or a combination of two or more zeolites among them.

The adsorbent used in the third adsorbing layer 7c and 8c can be, for example, an X zeolite containing sodium (sodium X zeolite), an A zeolite containing sodium (sodium A zeolite) or an A zeolite containing calcium (calcium A zeolite).

The purifying method according to the second embodiment of this invention, which uses the purifying apparatus illustrated in FIG. 2, is described below. When the purifying apparatus is used to purify the raw air RA, the first adsorbing layer 7a/8a remove $H_2O$ and the third adsorbing layer 7c/8c remove $CO_2$, respectively, from the raw air. After the nitrogen oxides and/or the hydrocarbons are removed by the second adsorbing layer 7b/8b, the purified air is conducted into the cryogenic air separation device 6 through the pipes L3a/L3b and L4.

The purifying apparatus of this embodiment can remove nitrogen oxides and/or hydrocarbons as effectively as the apparatus of the first embodiment can do. Consequently, nitrogen oxides and hydrocarbons can be prevented from being condensed in the distillate and the safety for operating the cryogenic air separation device 6 can be improved. Moreover, since the third adsorbing layer 7c/8c for adsorbing $CO_2$ is disposed between the first adsorbing layer 7a/8a and the second adsorbing layer 7b/8b in the purifying apparatus of this embodiment, the air can be supplied to the second adsorbing layer 7b/8b after $CO_2$ in the raw air is removed. Therefore, for the second adsorbing layer 7b/8b, the efficiency in removing nitrogen oxides and/or hydrocarbons can be improved.

The purifying apparatus of this invention can also be obtained by combining a conventional apparatus, which includes a $H_2O$-adsorbing layer for removing $H_2O$ and a $CO_2$-adsorbing layer for removing $CO_2$, with an adsorbing layer composed of the adsorbents of this invention (e.g., sodium magnesium X zeolites). Such an adsorbing layer is disposed at the downstream side of the $CO_2$-adsorbing layer. In this case, the adsorption cylinder of this invention can be obtained by filling the adsorbents of this invention (e.g., sodium magnesium X zeolites) into the adsorption cylinder of the conventional apparatus. Thus the cost required for fabricating the apparatus can be reduced.

EXAMPLES

Experiment 1

An ion-exchange treatment, which immerses a sodium X zeolite (NaX) in a solution containing magnesium ion for 30 minutes, is performed 3 times to obtain an adsorbent (NaMgX) whose magnesium percentage in the exchangeable cations (magnesium-exchange ratio) is about 65%. By adjusting the period and the number of times of the ion-exchange treatment, various sodium magnesium X zeolites (NaMgX) having different magnesium-exchange ratios are fabricated.

Figure 3:
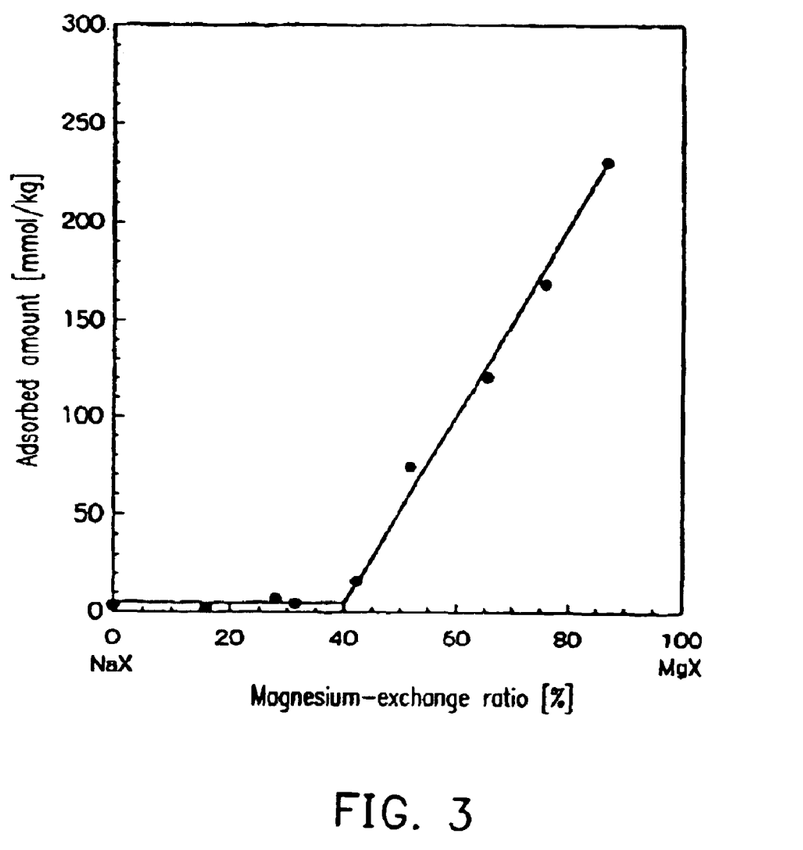
FIG. 3 plots the amount of adsorbed $N_2O$ with respect to the magnesium-exchange ratio of the sodium X zeolite.

FIG. 3 plots the results of $N_2O$ adsorption experiments using the sodium magnesium X zeolites (NaMgX). It can be observed from FIG. 3 that the amount of adsorbed $N_2O$ increases rapidly when the magnesium-exchange ratio exceeds 40%.

Accordingly, by increasing the magnesium-exchange ratio higher than 40%, the adsorptivity to $N_2O$ of the sodium magnesium X zeolite (NaMgX) can be raised.

Experiment 2

An ion-exchange treatment, which immerses a calcium X zeolite (CaX) in a solution containing magnesium ion for 30 minutes, is performed 20 times to obtain an adsorbent (MgCaX) whose magnesium percentage in the exchangeable cations (magnesium-exchange ratio) is about 55%. By adjusting the period and the number of times of the ion-exchange treatment, various magnesium calcium X zeolites (MgCaX) having different magnesium-exchange ratios are fabricated.

Figure 4:
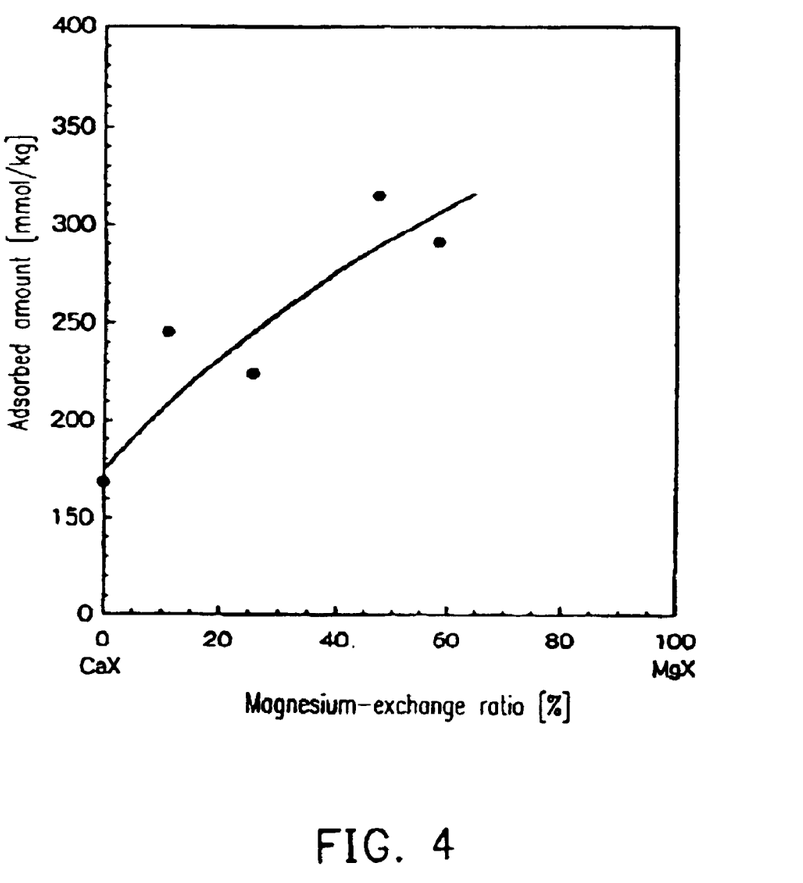
FIG. 4 plots the amount of adsorbed $N_2O$ with respect to the magnesium-exchange ratio of the calcium X zeolite.

FIG. 4 plots the results of $N_2O$ adsorption experiments using the magnesium calcium X zeolites (MgCaX). It is clear from FIG. 4 that the amount of adsorbed $N_2O$ increases as the magnesium-exchange ratio increases. When the magnesium-exchange ratio exceeds 5%, a significant increase in the amount of adsorbed $N_2O$ is clearly observed. Accordingly, by increasing the magnesium-exchange ratio higher than 5%, the adsorptivity to $N_2O$ of the magnesium calcium X zeolite (MgCaX) can be raised.

Experiment 3

An ion-exchange treatment, which immerses a calcium A zeolite (CaA) in a solution containing magnesium ion for 30 minutes, is performed 20 times to obtain an adsorbent (MgCaA) whose magnesium percentage in the exchangeable cations (magnesium-exchange ratio) is about 55%. By adjusting the period and the number of times of the ion-exchange treatment, various magnesium calcium A zeolites (MgCaA) having different magnesium-exchange ratios are fabricated.

Figure 5:
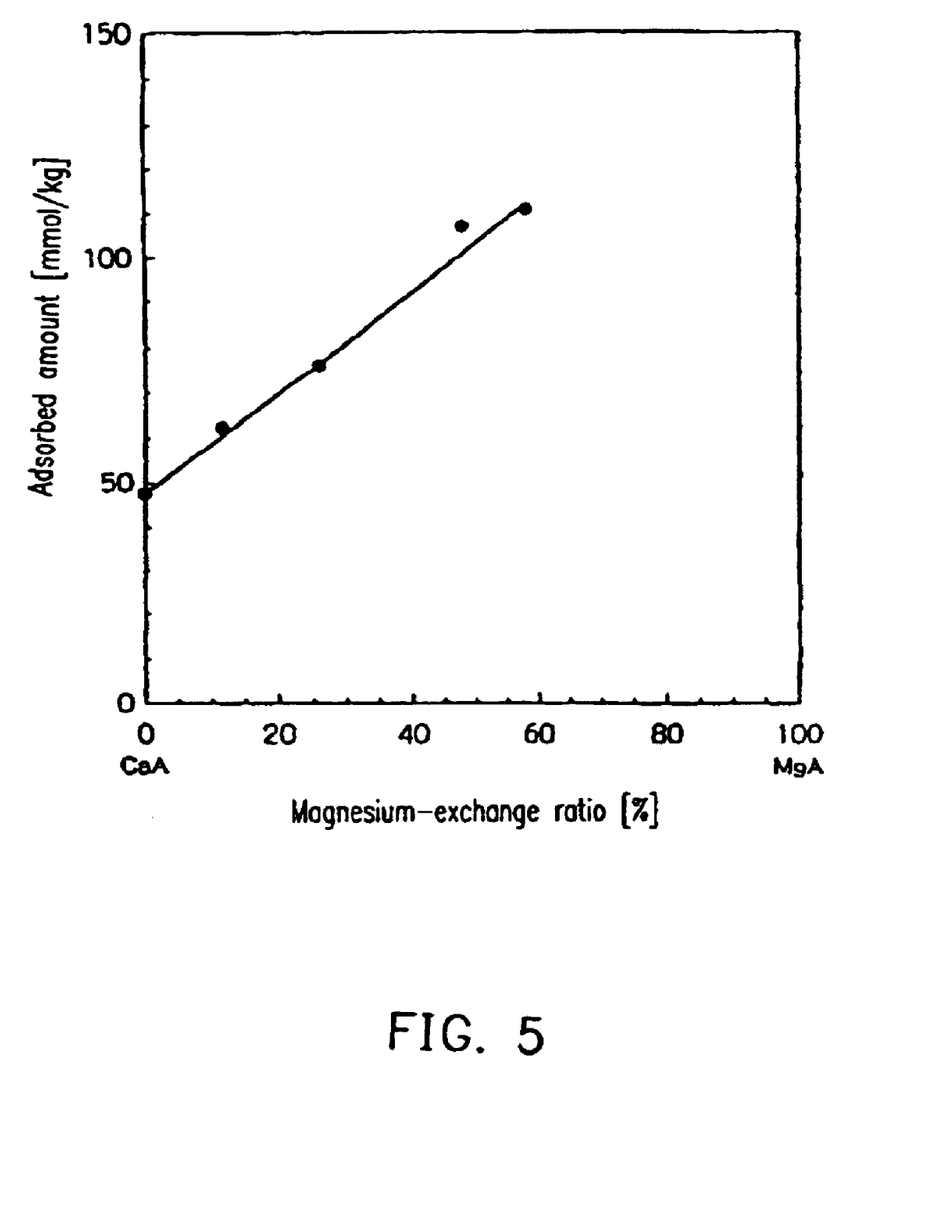
FIG. 5 plots the amount of adsorbed $N_2O$ with respect to the magnesium-exchange ratio of the calcium A zeolite.

FIG. 5 plots the results of $N_2O$ adsorption experiments using the magnesium calcium A zeolites (MgCaA). It is clear from FIG. 5 that the amount of adsorbed $N_2O$ increases as the magnesium-exchange ratio increases. When the magnesium-exchange ratio exceeds 5%, an increase of 10% in the amount of adsorbed $N_2O$ is observed as compared with the case wherein the magnesium-exchange ratio is 0% (CaA). Accordingly, by increasing the magnesium-exchange ratio higher than 5%, the adsorptivity to $N_2O$ of the magnesium calcium A zeolite (MgCaA) can be raised.

Experiment 4

A test is conducted to evaluate the adsorptivity of the adsorbents constituting the second adsorbing layer 7b and 8b that are capable of selectively adsorbing nitrogen oxides and/or hydrocarbons, wherein the nitrogen oxide used for the evaluation is $N_2O$. Normally, the concentration of $N_2O$ in the raw air is only approximately 0.3 ppm and the partial pressure of $N_2O$ is quite low, and the evaluation of the adsorbed amount of $N_2O$ is therefore conducted under low pressures. Each adsorbent is used to adsorb $N_2O$ and the $N_2O$-adsorption isotherms of the adsorbents are plotted. The temperature parameter of the adsorption test is 10° C. and the obtained adsorption isotherms are shown in FIG. 6.

Figure 6:
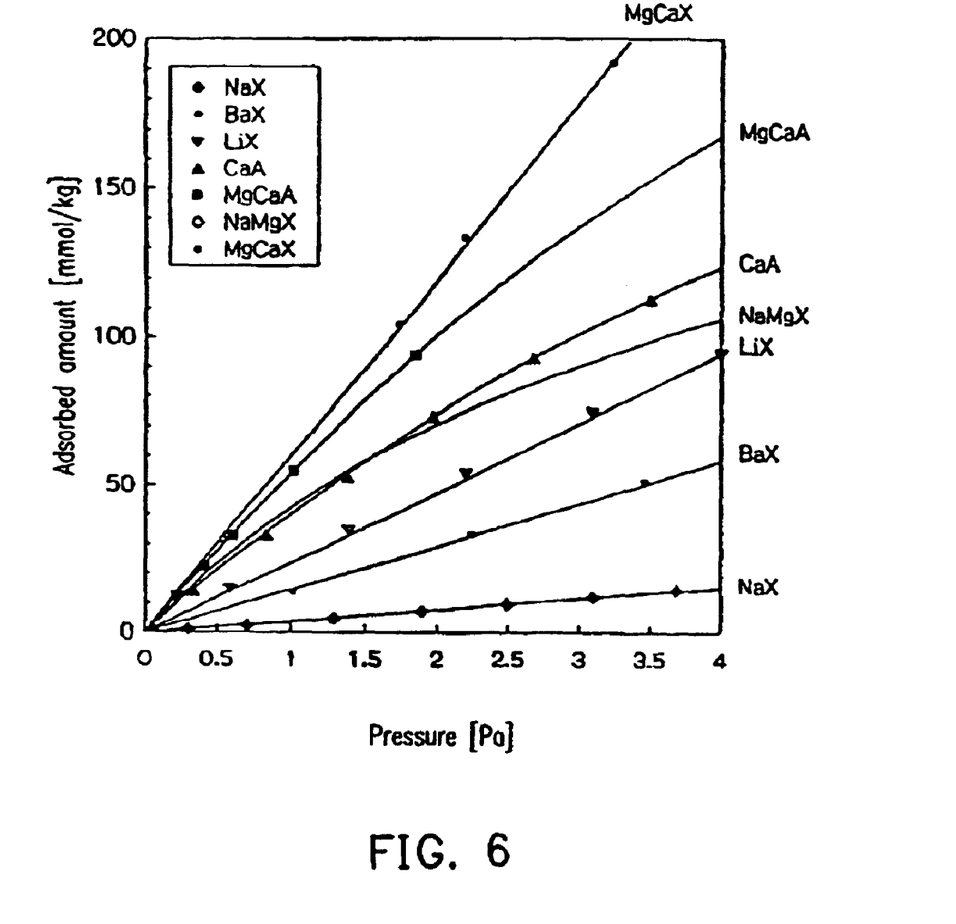
FIG. 6 plots isotherm for $N_2O$.

Refer to FIG. 6, as compared with the sodium X zeolite (NaX) used in the conventional purifying apparatus, the sodium magnesium X zeolite (NaMgX) with a magnesium-exchange ratio of 65% and the magnesium calcium X zeolite (MgCaX) with a magnesium-exchange ratio of 55% both are capable of adsorbing greater amounts of $N_2O$.

Moreover, FIG. 6 shows that the calcium A zeolite (CaA) and the magnesium calcium A zeolite (MgCaA) with a magnesium-exchange ratio of 55% both are capable of adsorbing greater amounts of $N_2O$, as compared with the sodium X zeolite (NaX). Furthermore, as shown in FIG. 6, the $N_2O$-adsorption amounts of the magnesium calcium A zeolites (MgCaA) are higher than those of the calcium A zeolite (CaA).

Refer to FIG. 6 again, by comparing the evaluating results of the sodium magnesium X zeolite (NaMgX) and those of the calcium A zeolite (CaA), it is seen that the NaMgX zeolites are capable of adsorbing more $N_2O$ under low pressures (<1.5 Pa), which correspond to the practical purifying conditions in real industrial application.

It is clear from the description above that by using sodium magnesium X zeolite (NaMgX) or A zeolites containing magnesium ion as an exchangeable cation, the adsorptivity for $N_2O$ can be raised.

Experiment 5

Figure 7:
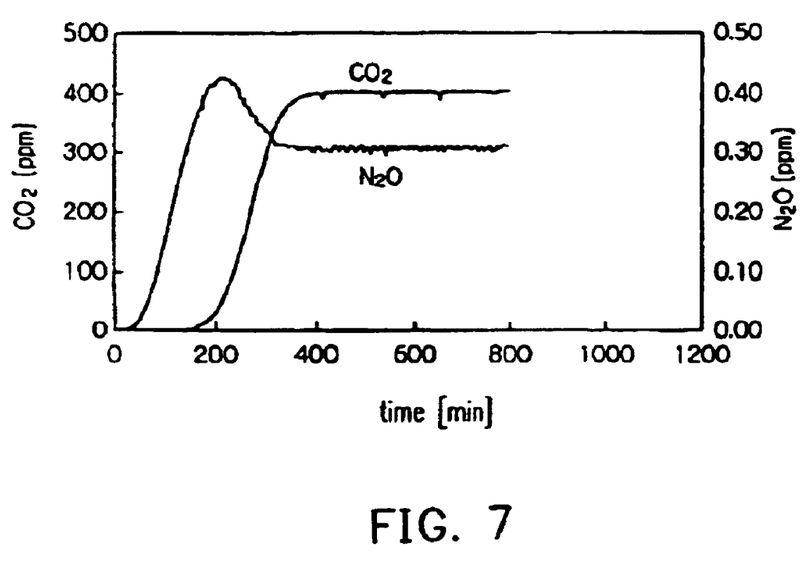
FIG. 7 plots a breakthrough curve of simultaneous adsorption of $CO_2$ and $N_2O$ with a sodium X zeolite.
Figure 8:
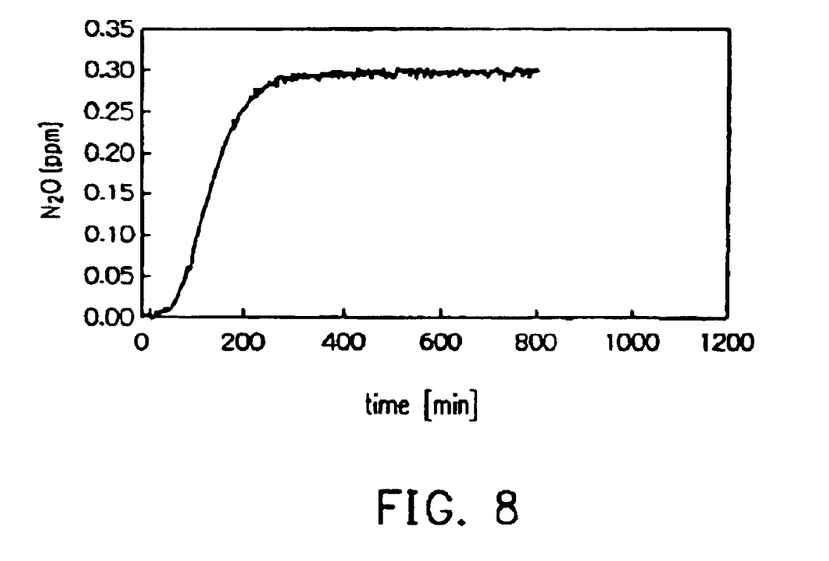
FIG. 8 plots a breakthrough curve of $N_2O$ adsorption with the sodium X zeolite, FIG. 9 plots a breakthrough curve of $CO_2$ adsorption with the sodium X zeolite, FIG. 10 plots a breakthrough curve of simultaneous adsorption of $CO_2$ and $N_2O$ with aOLE__LINK1 sodium magnesium XOLE__LINK1 zeolite.
Figure 9:
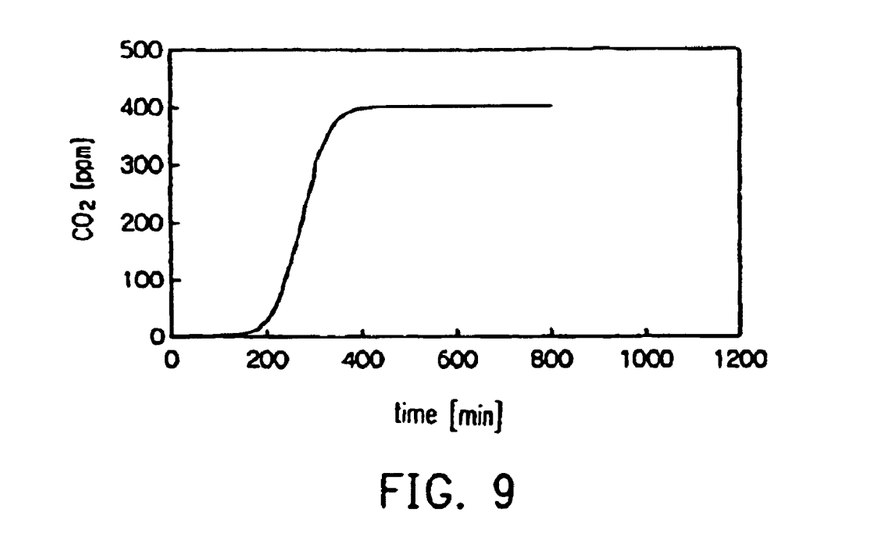

Adsorption tests are conducted for a sodium X zeolite (NaX) with $N_2O$ and $CO_2$ as the target components to be adsorbed. In the tests, the gas containing the target gases is made contact with the adsorbing layer and then the concentrations of the target gases in the gas passing the adsorbing layer are measured. FIG. 7~FIG. 9 plot the testing results of the sodium X zeolite (NaX), wherein FIG. 8 plots a breakthrough curve of $N_2O$ adsorption, FIG. 9 plots a breakthrough curve of $CO_2$ adsorption, and FIG. 7 plots a breakthrough curve of simultaneous adsorption of $N_2O$ and $CO_2$. It is clear from FIG. 8~FIG. 9 that the breakthrough time of $N_2O$ adsorption is shorter than that of $CO_2$ adsorption. It is also clear from FIG. 7 that the breakthrough of the $N_2O$ adsorption occurs earlier than that of the $CO_2$ adsorption when $N_2O$ and $CO_2$ are injected simultaneously. Therefore, it is difficult to simultaneously adsorb and remove $CO_2$ and $N_2O$ effectively with the sodium X zeolite (NaX) that is used to remove $CO_2$ in the prior art.

Experiment 6

Figure 10:
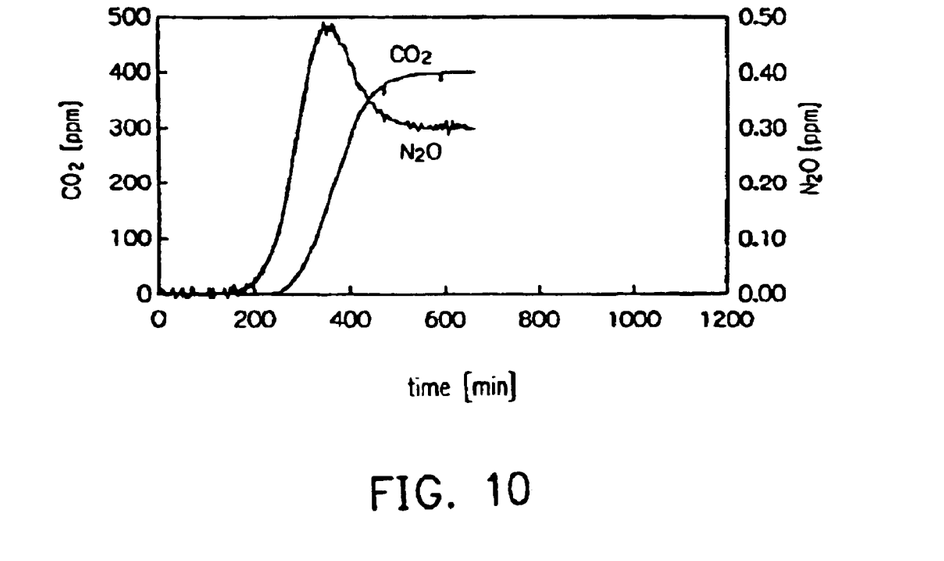
Figure 11:
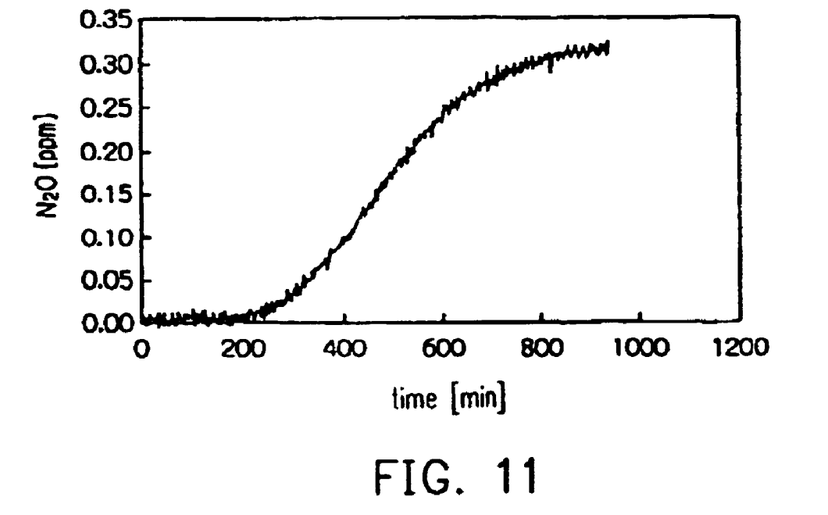
FIG. 11 plots a breakthrough curve of $N_2O$ adsorption with the sodium magnesium X zeolite.
Figure 12:
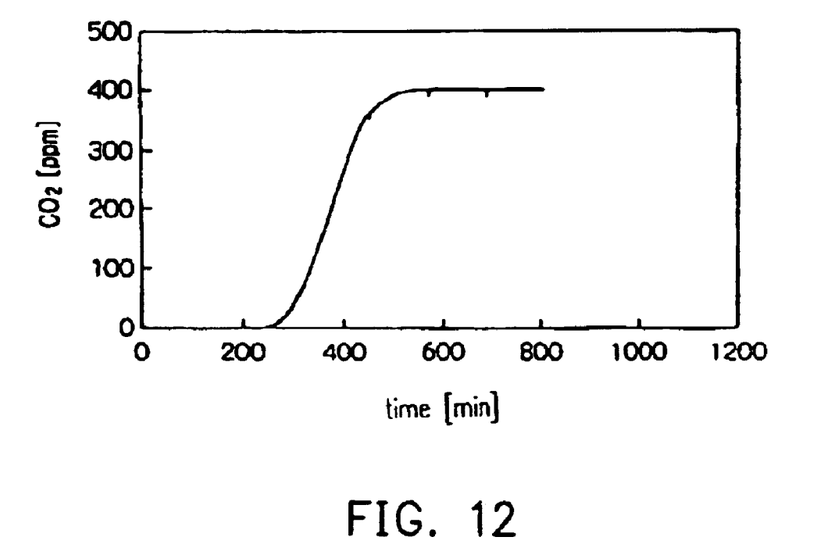
FIG. 12 plots a breakthrough curve of $CO_2$ adsorption with the sodium magnesium X zeolite.

Adsorption tests are conducted for sodium magnesium X zeolite (NaMgX) with $N_2O$ and $CO_2$ as the target gases to be adsorbed. The testing method follows that described in Experiment 5. FIG. 10~FIG. 12 plot the testing results of the sodium magnesium X zeolite (NaMgX) with a magnesium-exchange ratio of 65%. FIG. 11 plots a breakthrough curve of $N_2O$ adsorption, FIG. 12 plots a breakthrough curve of $CO_2$ adsorption, and FIG. 10 plots a breakthrough curve of simultaneous adsorption of $N_2O$ and $CO_2$. Refer to FIG. 11~FIG. 12, it is seen that the breakthrough time of $N_2O$ adsorption does not differ significantly from that of $CO_2$ adsorption, while the mass transfer zone of $N_2O$ is wider than that of $CO_2$. Refer to FIG. 10, the breakthrough time of each component is almost the same as that observed in the adsorption test that uses the component only (FIG. 11 and FIG. 12), while the mass transfer zone of $N_2O$ is narrowed because of the effect of $CO_2$ adsorption.

It is found out from the testing results that when the sodium magnesium X zeolite (NaMgX) is used, $CO_2$ and $N_2O$ both can be adsorbed and removed simultaneously. Therefore, by using an adsorbent capable of selectively adsorbing $H_2O$ in the first adsorbing layer and using the sodium magnesium X zeolite (NaMgX) in the second adsorbing layer, $H_2O$, nitrogen oxides and $CO_2$ can be removed effectively.

Experiment 7

Figure 13:
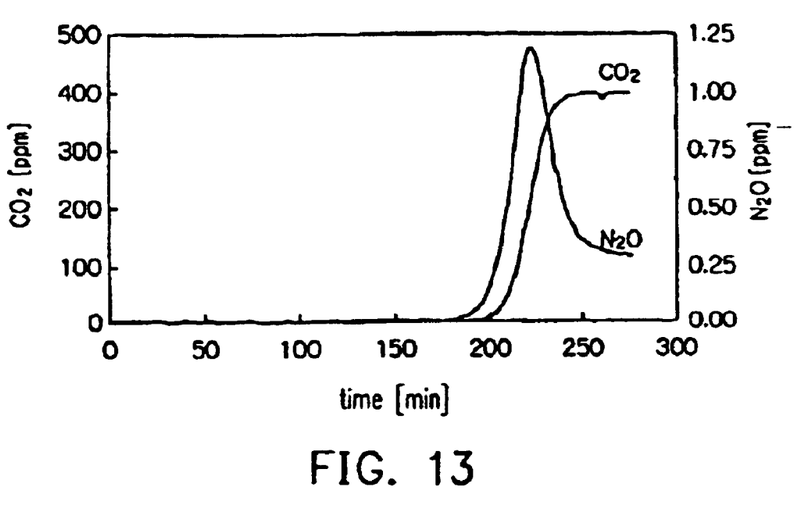
FIG. 13 plots a breakthrough curve of simultaneous adsorption of $CO_2$ and $N_2O$ with a magnesium calcium A zeolite.
Figure 14:
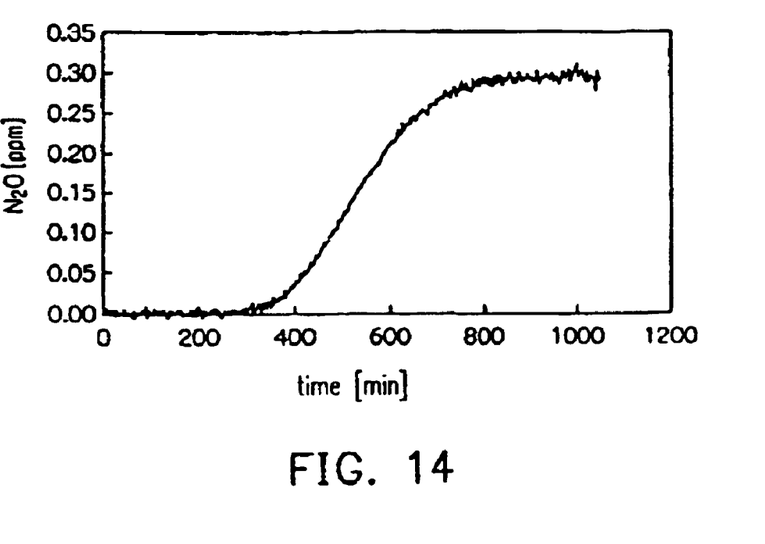
FIG. 14 plots a breakthrough curve of $N_2O$ adsorption with the magnesium calcium A zeolite.
Figure 15:
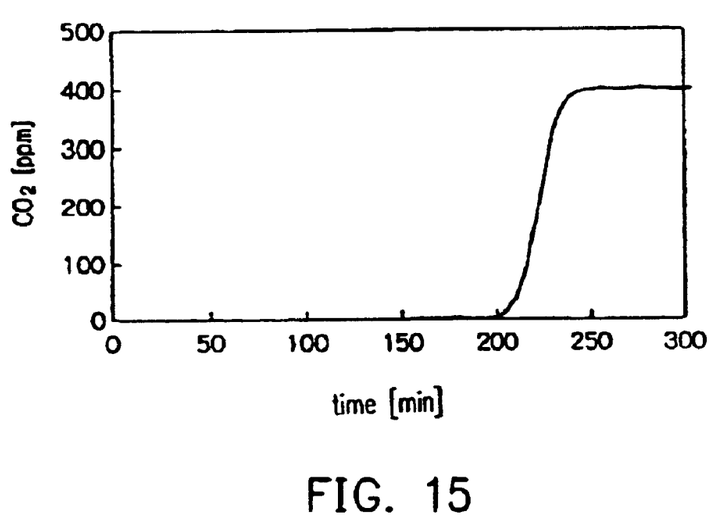
FIG. 15 plots a breakthrough curve of $CO_2$ adsorption with the magnesium calcium A zeolite.

Adsorption tests are conducted for a magnesium calcium A zeolite (MgCaA) of this invention with $N_2O$ and $CO_2$ as the target components to be adsorbed, wherein the testing method follows that described in Experiment 5. FIG. 13~15 plot the testing results of the magnesium calcium A zeolite (MgCaA), wherein FIG. 14 plots a breakthrough curve of $N_2O$ adsorption, FIG. 15 plots a breakthrough curve of $CO_2$ adsorption, and FIG. 13 plots a breakthrough curve of simultaneous adsorption of $N_2O$ and $CO_2$. It is clear from FIG. 13 that when $N_2O$ and $CO_2$ are simultaneously adsorbed, the breakthrough time of each component is almost the same as compared with that observed in the adsorption test that uses the component only (FIG. 14~15). Therefore, it can be concluded from the testing results that the magnesium calcium A zeolite (MgCaA) is capable of adsorbing and removing $CO_2$ and $N_2O$ simultaneously and effectively.

Example 1

The purifying apparatus illustrated by FIG. 2 is used to purify the air with the following conditions. The adsorption cylinder 7/8 comprises, from the upstream side to the downstream side, the first adsorbing layer 7a/8a constituted by alumina gel, the third adsorbing layer 7c/8c constituted by a sodium X zeolite (NaX) and the second adsorbing layer 7b/8b constituted by a sodium magnesium X zeolite (NaMgX). The raw air is compressed to 550 kPa by the air compressor 1 and then cooled to 10° C. by the cooler 2. The impurities in the air, including $H_2O$, $CO_2$ and nitrogen oxides, are then adsorbed and removed in the adsorber 4. In addition, the concentration of $N_2O$ in the raw air is 0.3 ppm. The adsorption cylinders 7 and 8 are switched every 4 hours. The testing result shows that no $H_2O$, $CO_2$ or $N_2O$ can be detected in the gas conducted out of the adsorber 4.

As described above, the apparatus for purifying the raw air used in cryogenic air separation comprises an adsorber comprising an adsorption cylinder that has a first adsorbing layer and a second adsorbing layer therein. The first adsorbing layer is composed of a first adsorbent capable of selectively adsorbing water in the air. The second adsorbing layer is composed of a second adsorbent capable of selectively adsorbing nitrogen oxides and/or hydrocarbons. The second adsorbent comprises an X zeolite containing magnesium ion as an ion-exchangeable cation for removing the nitrogen oxides and/or the hydrocarbons effectively. Therefore, the nitrogen oxides and the hydrocarbons can be prevented from being condensed in the distillate in advance, and the safety for operating the cryogenic air separation device can be improved.

Moreover, by disposing the third adsorbing layer for adsorbing and removing $CO_2$ between the first adsorbing layer and the second adsorbing layer, the air can be supplied to the second adsorbing layer after $CO_2$ in the air is removed. Therefore, for the second adsorbing layer, the efficiency in removing nitrogen oxides and/or hydrocarbons can be improved.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An apparatus for purifying air used as a raw material in cryogenic air separation that separates nitrogen and oxygen mainly by distilling the air at low temperatures, comprising:

an adsorber comprising an adsorption cylinder that comprises a first adsorbing layer and a second adsorbing layer, wherein the first adsorbing layer comprises a first adsorbent capable of selectively adsorbing water in the air and the second adsorbing layer comprises a second adsorbent capable of selectively adsorbing nitrogen oxides and/or hydrocarbons in the air passing the first adsorbing layer, wherein the second adsorbent comprises an X zeolite containing magnesium ion as an ion-exchangeable cation, and a magnesium-exchange ratio in total cations of the X zeolite is higher than 40%, wherein the second adsorbent contains merely a trace of A zeolite as an impurity.

2. An apparatus for purifying air used as a raw material in cryogenic air separation that separates nitrogen and oxygen mainly by distilling the air at low temperatures, comprising:

an adsorber comprising an adsorption cylinder that comprises a first adsorbing layer and a second adsorbing layer, wherein the first adsorbing layer comprises a first adsorbent capable of selectively adsorbing water in the air and the second adsorbing layer comprises a second adsorbent capable of selectively adsorbing nitrogen oxides and/or hydrocarbons in the air passing the first adsorbing layer, wherein the second adsorbent comprises an X zeolite containing magnesium and calcium ions as ion-exchangeable cations, and a magnesium-exchange ratio in total cations of the X zeolite is higher than 5%, wherein the second adsorbent contains merely a trace of A zeolite as an impurity.

3. An apparatus for purifying air used as a raw material in cryogenic air separation that separates nitrogen and oxygen mainly by distilling the air at low temperatures, comprising:

an adsorber comprising an adsorption cylinder that comprises a first adsorbing layer and a second adsorbing layer, wherein the first adsorbing layer comprises a first adsorbent capable of selectively adsorbing water in the air and the second adsorbing layer comprises a second adsorbent capable of selectively adsorbing nitrogen oxides and/or hydrocarbons in the air passing the first adsorbing layer, wherein the second adsorbent comprises an A zeolite containing calcium and magnesium ions as ion-exchangeable cations without an X zeolite, and a magnesium-exchange ratio in total cations of the A zeolite is higher than 5%.

4. The apparatus of claim 1, wherein a third adsorbing layer is disposed between the first adsorbing layer and the second adsorbing layer, wherein the third adsorbing layer comprises an adsorbent capable of selectively adsorbing $CO_2$ in the air.

5. A method for purifying air used as a raw material in cryogenic air separation that separates nitrogen and oxygen mainly by distilling the air at low temperatures, comprising:

providing a purifying apparatus comprising an adsorber, the adsorber comprising an adsorption cylinder that comprises a first adsorbing layer and a second adsorbing layer, wherein the first adsorbing layer comprises a first adsorbent capable of selectively adsorbing water in the air and the second adsorbing layer comprises a second adsorbent capable of selectively adsorbing nitrogen oxides and/or hydrocarbons in the air passing the first adsorbing layer, wherein the second adsorbent comprises an X zeolite containing magnesium ion as an ion-exchangeable cation, and a magnesium-exchange ratio in total cations of the X zeolite is higher than 40%, wherein the second adsorbent contains merely a trace of A zeolite as an impurity; and using the first adsorbing layer to adsorb and remove water from the raw air and then using the second adsorbing layer to adsorb and remove the nitrogen oxides and/or the hydrocarbons from the raw air.

6. The method of claim 5, wherein the second adsorbing layer also adsorbs and removes $CO_2$ from the raw air.

7. The method of claim 5, wherein the purifying apparatus is used with a third adsorbing layer disposed between the first adsorbing layer and the second adsorbing layer, the third adsorbing layer comprising an adsorbent capable of selectively adsorbing $CO_2$ and the method further comprising using the third adsorbing layer to adsorb and remove $CO_2$ from the air passing the first adsorbing layer.

* * * * *